Oct. 22, 1929.    J. HARRIS    1,732,333
INDUCTION ELECTRICITY METER
Filed April 23, 1928
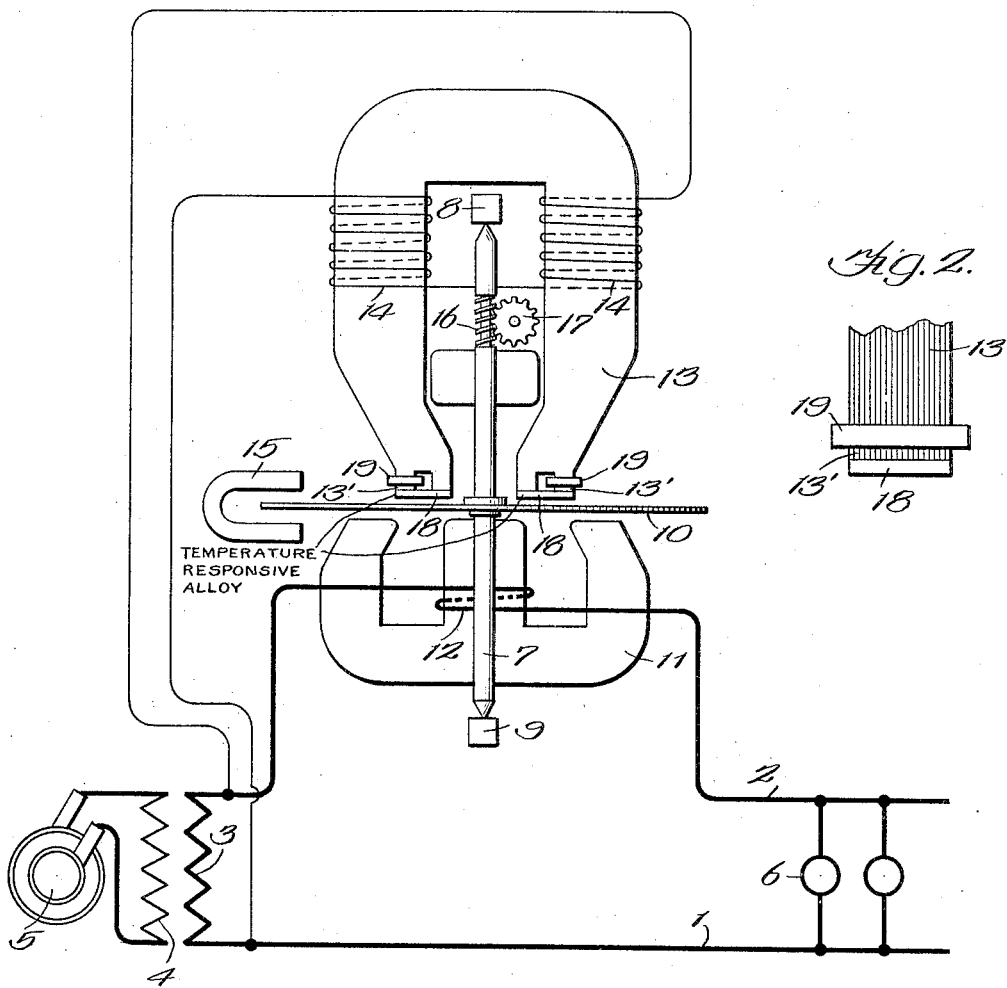

Patented Oct. 22, 1929

1,732,333

UNITED STATES PATENT OFFICE

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

INDUCTION ELECTRICITY METER

Application filed April 23, 1928. Serial No. 272,142.

My invention relates to induction electricity meters and is of particular service in connection with watthour meters.

My invention has for its object the prevention of errors in such a meter due to temperature changes on fractional power factor as well as on unity power factor. A meter accomplishing both results is inclusive of a torque producing magnet system having current and pressure windings, a device responsive to changes in temperature for varying the reluctance in the circuit of the torque producing flux of the meter set up by said magnet system and serving to increase this reluctance upon increase in temperature and to reduce this reluctance upon decrease in temperature, a closed metallic conductor upon the rotating element of the meter, a damping magnet whose flux threads this conductor and the permeability of which magnet decreases upon rise of temperature, whereby temperature changes upon unity power factor are compensated for, and a closed conductor for establishing quadrature relation between the current and pressure fluxes, there being a local magnetic circuit for the flux due to said closed conductor and inclusive of the aforesaid temperature responsive device, said local magnetic circuit serving to direct flux from the main magnetic circuit of the meter, whereby temperature changes upon fractional power factors are compensated for.

The invention will be more fully explained in connection with the accompanying drawing in which Fig. 1 is a diagrammatic view of one well known form of meter as it is preferably equipped in accordance with my invention, an alternating current system to which the meter is supplied being also diagrammatically shown; and Fig. 2 is a side view of one end of the pressure core with the correcting magnetically permeable body supplied thereto.

I have illustrated transmission mains 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6. The energy consumed by the load is measured by a watt meter, usually of the induction watthour or integrating type, such a meter being illustrated in the drawing. This meter is inclusive of an upright spindle or shaft 7 suitably held in bearings 8 and 9. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in the main 2. The pressure magnet is inclusive of a U shaped laminated iron core 13 whose legs are surrounded by the coils 14 which are connected in series in the same bridge between the distributing mains 1 and 2. The speed of the armature of the meter is checked by the permanent magnet 15 which embraces the peripheral portion of the disc with which it is in inductive relation. The meter parts illustrated and described constitute a meter motor whose armature 10 and spindle 7 turn proportionately to the wattage in a manner well known to those familiar with the art.

A worm 16 is provided upon the spindle 7 and is in mesh with a pinion 17 that is in driving relation with the counting train of the meter, as is well understood without the necessity of further illustration.

The temperature effected changes in the torque of the meter are in a direction to assist in the correction of the errors at the damping magnet, but do not proceed far enough. The variable reluctance which I employ, serves, upon increase in temperature, to reduce the torque producing flux and, upon decrease in temperature, to increase the torque producing flux to an extent to prevent temperature effected errors arising in the motion producing magnet system and also at the motion damping magnet. To this end I preferably place upon either or each end of the pressure core 13 a body of magnetically permeable material 18 which has the property of increasing the reluctance of the main magnetic circuit of the motion producing magnet system upon increase in temperature and of reducing this reluctance upon decrease in temperature whereby the torque is reduced upon increase in temperature and is increased upon reduction in temperature. In other words, the magnetic permeability of the bodies 18 falls upon increase in temperature and rises upon reduction in temperature more than the permeability of the core structure of the torque producing magnet system and the damping magnet with the results stated. This characteristic of the meter thus far described broadly forms the subject matter of my Patent 1,659,429, dated February 14, 1928. I additionally bifurcate the polar ends of the pressure core and dispose closed conductors 19 around the branches or sides 13′ of the bifurcated polar ends. These conductors 19 serve to establish quadrature relation between the current and pressure fields and may be in the form of plates with holes therethrough which receive the core portions 13′. The pole tips 18 are upon the extreme ends of the core 13, each such tip being desirably applied to both branches of the adjacent polar end and lapping the gap between these branches.

Thus on unity power factor, the torque produced by the motor element decreases upon a rise in temperature and increases upon a decrease in temperature, because of the pole tips 18, which form part of the main magnetic circuit and have a negative temperature coefficient to magnetism, compensation being thus effected for the variations in the holding power of the drag magnet caused by changes in temperature.

On fractional power factor in an uncompensated meter, additional errors are caused by the shifting of the phase relation of the current and pressure fluxes, being less than quarter phase upon a rise and greater than quarter phase upon a decrease in temperature. As herein arranged, the alloy tips 18 and the bifurcated ends of core 13 form local magnetic flux circuits which shunt flux produced by the lag coils, plates, or closed conductors 19 out of the main flux path of the meter in proportion to the magnetic permeability of these local magnetic flux circuits and as this permeability changes with temperature and is higher on a low temperature and less upon a high temperature, said lag coils are more and more effective as the temperature rises and less and less effective as the temperature decreases. My device thus supplies the needed additional phase adjustment for fractional power factor correction.

A suitable material for the plates 19 is an alloy of iron and nickel suited to the particular meter to be supplied therewith. A suitable alloy for some meters comprises 62½ parts of iron, 37½ parts of nickel by weight, commonly known as Guilleaume steel.

Changes may be made without departing from the invention.

Having thus described my invention, I claim:

1. A rotating induction electricity meter including a torque producing magnet system having current and pressure windings; a device responsive to changes in temperature for varying the reluctance in the circuit of the torque producing flux of the meter set up by said magnet system and serving to increase this reluctance upon increase in temperature and to reduce this reluctance upon decrease in temperature; a closed metallic conductor upon the rotating element of the meter; a damping magnet whose flux threads this conductor; and a closed conductor for establishing quadrature relation between the current and pressure fluxes, there being a local magnetic circuit for the flux due to said closed conductor and inclusive of the aforesaid temperature responsive device, said local magnetic circuit serving to direct flux from the main magnetic circuit of the meter, whereby temperature changes at fractional power factors are compensated for.

2. A rotating induction electricity meter including a torque producing magnet system having current and pressure windings and a magnetic core structure; a body of magnetically permeable material traversed by the torque producing flux set up by said magnet system and whose permeability varies more upon change in temperature than the permeability of said core structure and upon increase in temperature having its permeability reduced more than the permeability of said core structure and upon reduction in temperature having its permeability increased more than the permeability of said core structure; a closed metallic conductor upon the rotating element of the meter; a damping magnet whose flux threads this conductor; and a closed conductor for establishing quadrature relation between the current and pressure fluxes, there being a local magnetic circuit for the flux due to said closed conductor and inclusive of the aforesaid body of magnetically permeable material, said local magnetic circuit serving to direct flux from the main magnetic circuit of the meter, whereby temperature changes at fractional power factors are compensated for.

3. An electricity meter including a rotating induction motor having a torque producing magnet system provided with a magnetic core structure and inducing torque effecting current and pressure windings and employing a closed metallic conductor upon the rotating element of the motor and a damping magnet in inductive relation to said closed conductor; a body of magnetically permeable material traversed by the torque producing flux set up by said magnet system and whose permeability varies more upon change in temperature than the permeability of said core structure and permanent magnet and upon increase in temperature, having its permeability reduced more than the permeability of said core structure and permanent magnet and upon reduction in temperature having its permeability increased more than the permeability of said core structure and permanent magnet, to compensate for temperature effected changes in the dragging action of the damping magnet, whereby temperature changes at unity power factor are compensated for; and a closed conductor for establishing quadrature relation between the current and pressure fluxes, there being a local magnetic circuit for the flux due to said closed conductor and inclusive of the aforesaid body of magnetically permeable material, said local magnetic circuit serving to direct flux from the main magnetic circuit of the meter, whereby temperature changes at fractional power factors are compensated for.

4. A rotating induction electricity meter including a torque producing magnet system having current and pressure windings and a magnetic core structure; a body of magnetically permeable material traversed by the torque producing flux set up by said magnet system and whose permeability varies more upon change in temperature than the permeability of said core structure; a closed metallic conductor upon the rotating element of the meter; a damping magnet whose flux threads this conductor; and a closed conductor for establishing quadrature relation between the current and pressure fluxes, there being a local magnetic circuit for the flux due to said closed conductor and inclusive of the aforesaid body of magnetically permeable material, said local magnetic circuit serving to direct flux from the main magnetic circuit of the meter, whereby temperature changes at fractional power factors are compensated for.

5. The structure of claim 2 wherein the core structure includes a core end portion formed in branches and the body of magnetically permeable material is provided upon the tip of said core end portion.

6. The structure of claim 3 wherein the core structure includes a core end portion formed in branches and the body of magnetically permeable material is provided upon the tip of said core end portion.

7. The structure of claim 4 wherein the core structure includes a core end portion formed in branches and the body of magnetically permeable material is provided upon the tip of said core end portion.

8. The structure of claim 2 wherein the core structure includes a core end portion formed in branches and the body of magnetically permeable material is provided upon the tip of said core end portion and upon both of the branches of this core end portion.

9. The structure of claim 3 wherein the core structure includes a core end portion formed in branches and the body of magnetically permeable material is provided upon the tip of said core end portion and upon both of the branches of this core end portion.

10. The structure of claim 4 wherein the core structure includes a core end portion formed in branches and the body of magnetically permeable material is provided upon the tip of said core end portion and upon both of the branches of this core end portion.

11. The structure of claim 2 wherein the pressure winding has a core that has an end portion formed in branches and the body of magnetically permeable material is provided upon the tip of said core end portion.

12. The structure of claim 3 wherein the pressure winding has a core that has an end portion formed in branches and the body of magnetically permeable material is provided upon the tip of said core end portion.

13. The structure of claim 4 wherein the pressure winding has a core that has an end portion formed in branches and the body of magnetically permeable material is provided upon the tip of said core end portion.

14. The structure of claim 2 wherein the pressure winding has a core that has an end portion formed in branches and the body of magnetically permeable material is provided upon the tip of said core end portion and upon both of the branches of this core end portion.

15. The structure of claim 3 wherein the pressure winding has a core that has an end portion formed in branches and the body of magnetically permeable material is provided upon the tip of said core end portion and upon both of the branches of this core end portion.

16. The structure of claim 4 wherein the pressure winding has a core that has an end portion formed in branches and the body of magnetically permeable material is provided upon the tip of said core end portion and upon both of the branches of this core end portion.

In witness whereof, I hereunto subscribe my name.

JESSE HARRIS.